(12) United States Patent
Kuksenkov (10) Patent No.: US 6,646,785 B2
(45) Date of Patent: Nov. 11, 2003

(54) FIBER RING AMPLIFIERS AND LASERS

(75) Inventor: Dmitri V Kuksenkov, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/061,803

(22) Filed: Jan. 31, 2002

(65) Prior Publication Data

US 2003/0142393 A1 Jul. 31, 2003

(51) Int. Cl.[7] .................................................. H01S 3/00
(52) U.S. Cl. .................. 359/334; 359/160; 359/341.31; 359/341.32; 372/3; 372/72
(58) Field of Search ................................ 359/134, 160, 359/334, 341.3, 341.32; 372/3, 72; 385/112

(56) References Cited

U.S. PATENT DOCUMENTS

| | | | | |
|---|---|---|---|---|
| 5,323,404 A | * | 6/1994 | Grubb ............................. | 372/6 |
| 5,623,508 A | * | 4/1997 | Grubb et al. .................... | 372/3 |
| 5,815,518 A | | 9/1998 | Reed et al. ...................... | 372/6 |
| 6,147,794 A | * | 11/2000 | Stentz ........................... | 359/334 |
| 6,304,368 B1 | * | 10/2001 | Hansen et al. ............... | 359/334 |
| 6,434,172 B1 | * | 8/2002 | DiGiovanni et al. ........... | 372/6 |
| 6,480,326 B2 | * | 11/2002 | Papernyi et al. ............ | 359/334 |

FOREIGN PATENT DOCUMENTS

| | | | | |
|---|---|---|---|---|
| EP | 1022870 | * | 7/2000 | |
| RU | 954072 | * | 11/1999 | |
| RU | 1102114 | * | 12/2000 | |
| WO | WO 96/37936 | | 11/1996 | ............. H01S/3/30 |
| WO | 00/4974 | * | 8/2000 | |
| WO | 00/73849 | * | 12/2000 | |
| WO | 01152372 | * | 7/2001 | |

OTHER PUBLICATIONS

Nielsen et al, IEEE Photonics Technology Letters, vol. 10, #10, pp 1492–4, Oct. 1998.*

"8×10 Gb/s 1.3–$\mu$m Unrepeatered Transmission Over a Distance of 141 km with Raman Post–and Pre–amplifiers" Nielsen et al., IEEE Photonics Technology Letters, vol. 10, No. 10, Oct. 1998. p. 1492–1494.

"Transparent 80 km Bi–Directionally Pumped Distributed Raman Amplifiier With Second Order Pumping" Rottwitt et al, ECOC '99, France, II–144–145.

"High–gain, monolithic, cascaded fibre Raman amplifier operating at 1.3 $\mu$m" Chernikov et al. Electronics Letters, Mar. 16, 1995, vol. 31, No. 6, p. 472–473.

"Raman fibre laser operating at 1.24 $\mu$m" Chernikov et al. Electronics Letters, Apr. 2, 1998, vol. 34, No. 7, p. 680–681.

"Efficient cascaded Raman generation and signal amplification at 1.3 $\mu$m in GeO$_2$—doped single–mode fibre" Chang et al. Optics Communications 142, 1997, 289–293.

* cited by examiner

Primary Examiner—Nelson Moskowitz
(74) Attorney, Agent, or Firm—Svetlana Z. Short (57) ABSTRACT

An optical amplifier is provided comprising an optical fiber ring, and a pump light emitting device providing a primary pump wavelength. The pump light emitting device is optically coupled to the optical fiber ring and utilizes the primary pump wavelength to generate a secondary pump wavelength. Optical signal amplification and secondary pump wavelength lasing occur within the same section of the optical fiber ring.

33 Claims, 4 Drawing Sheets

FIBER RING AMPLIFIERS AND LASERS

BACKGROUND OF THE INVENTION

1. Field of the Invention

The invention relates generally to amplifying light in an optical signal wavelength range, and more particularly, to fiber amplifiers comprising an amplifying fiber and a pump source.

2. Description of the Related Art

Optical fiber amplifiers based on Stimulated Raman Scattering (SRS) effect, also known as Raman amplifiers, are attracting considerable interest for use in telecommunications. They provide a gain bandwidth that is sufficiently wide to allow simultaneous amplification of many spectral channels in wavelength division multiplexed (WDM) systems. Raman amplifiers are typically implemented in a distributed configuration or a discrete configuration.

Raman amplifiers in a distributed configuration amplify light in an optical wavelength range within the transmission fiber itself. In one such distributed configuration, light at a primary pump wavelength(s) (i.e., pump light) is coupled to one end of a transmission fiber. Light in an optical signal wavelength range, typically comprising many discrete wavelength channels (i.e., optical signals), is coupled into the other end of the same transmission fiber. Energy is gradually transferred from the pump light propagating in a reverse direction to the optical signals propagating in a forward direction, which is known as backward-pumped Raman amplification.

There are disadvantages, however, to conventional distributed amplifier configurations. As pump light propagates in a reverse direction in a transmission fiber, it is attenuated due to the passive loss in the fiber, so substantial amplification only takes place in about the last 20 km of the link (i.e. the 20 km nearest to the pump). Increasing pump power beyond a certain limit, typically about 800 mW, is not practical due to Raleigh backscattering in the amplifying section of the transmission fiber, which causes a significant noise increase in the optical signals being amplified.

Raman amplifiers in a discrete configuration amplify an optical signal within a section of specially designed amplification fiber packaged together with a pump source. Conventional discrete configurations typically employ only a few kilometers of amplifying fiber, so Raleigh backscattering is less significant than in conventional distributed configurations. However, discrete configurations also suffer from many problems. Some of the pump power is lost as the pump light propagates through the amplifying section of fiber, as described above with respect to conventional distributed configurations. A much greater amount of pump power, however, is lost as the pump light escapes at the other end of the amplifying fiber. Pump leakage, as this phenomenon is commonly described, is typically in the range of about 15 to about 85% of the total optical power at the primary pump wavelength(s), and is at least partially responsible for poor pump conversion efficiency of conventional discrete configurations.

Discrete Raman amplifiers typically require relatively high pump power, of an order of 1 W or more. A source commonly used to pump such amplifiers is known as a cascaded fiber Raman laser. In a cascaded fiber Raman laser, primary pump light (typically, from a rare-earth doped fiber laser) creates gain at a wavelength longer than the primary pump wavelength by the amount of so-called Stokes shift (about 60 nm to about 100 nm in silica based fibers) by stimulated Raman scattering (SRS). If an optical feedback is provided for light at this new wavelength, also called the first Stokes order, lasing at this new wavelength will occur. Lasing at the first Stokes order creates gain and causes lasing at the second Stokes order, at a wavelength longer than the first Stokes order by one more Stokes shift and so on. By generating a certain number of Stokes orders, the output of the rare-earth doped fiber laser is effectively translated to a much longer wavelength where it needs to be to create gain in an optical transmission signal wavelength range.

Several solutions for the aforementioned pump leakage problem in discrete Raman amplifiers pumped by a cascaded Raman laser have been suggested. In one such configuration, light at a primary pump wavelength, generated by a Yb fiber laser, circulates in a fiber ring formed with several wavelength-selective fiber couplers. The fiber ring is used to bi-directionally generate third Stokes order in respect to the primary pump wavelength. In turn, the third Stokes order light amplifies light at an optical signal wavelength, passing through the same fiber ring.

In another configuration, a cascaded Raman fiber laser and amplifying fiber are spliced together to form a fiber ring. Primary pump wavelength light as well as optical signal wavelength light are coupled in and out of the ring using wavelength-selective fiber couplers.

The aforementioned discrete amplifier configurations are not, however, free of disadvantages. Bi-directional generation of Stokes orders means that part of the pump light is co-propagating with signal, which can lead to a large amount of noise being transferred form the light at a primary pump wavelength to the light at an optical signal wavelength. Further, pump leakage can still be a problem due to light at the primary pump wavelength exiting the ring through the output coupler.

Designs that provide secondary pump wavelength generation and optical signal amplification in different parts of a fiber ring utilize a relatively large number of passive components such as isolators, couplers and filters, each contributing to optical losses, thereby decreasing the overall efficiency and noise figure of the amplifier, and substantially increasing the cost of manufacturing the amplifier.

Thus, a need exists for an optical amplifier with improved efficiency, low noise, and a relatively low manufacturing cost.

SUMMARY OF THE INVENTION

The present invention is directed at improving or overcoming one or more of the problems listed above, and other problems found within the prior art.

According to one embodiment of the present invention, an optical amplifier comprises an optical fiber ring, and a pump source emitting light at at least one primary pump wavelength, the light being optically coupled to the optical fiber ring and generating light at at least one secondary pump wavelength, wherein optical signal amplification and secondary pump wavelength lasing occur within the same section of the optical fiber ring.

According to an illustrative embodiment of the present invention, the pump source emits light at a plurality of pump wavelengths.

According to an illustrative embodiment of the present invention, the primary pump wavelength produces lasing at a secondary pump wavelength by stimulated Raman scattering effect in the nth Stokes order, n being an integer.

According to an embodiment of the present invention, the secondary pump wavelength lasing amplifies an optical signal by stimulated Raman scattering in the first Stokes order.

According to an embodiment of the present invention, the optical fiber ring includes an optical isolator that allows the light at a secondary pump wavelength to circulate in only one direction within the optical fiber ring.

According to an embodiment of the present invention, the optical fiber has a core and a cladding, the core comprising materials having stimulated Raman scattering cross-sections sufficiently high to provide amplification of light at a secondary pump wavelength and light at an optical signal wavelength, and the core having a refraction index sufficiently higher than the refractive index of the cladding to guide light at the primary pump wavelength and secondary pump wavelength and signal wavelength. Preferably, the core is. doped with at least one of $GeO_2$ and $P_2O_5$.

According to an embodiment of the present invention, the pump source comprises one of a semiconductor laser, a rare-earth ion doped fiber laser and a Raman laser.

According to an embodiment of the present invention, the optical fiber ring includes two wavelength-selective optical coupler devices, the coupler devices coupling light at a primary pump wavelength and light at an optical signal wavelength in and out of the optical fiber ring and allowing light at a secondary pump wavelength to circulate within the optical fiber ring.

According to an embodiment of the present invention, the optical fiber ring includes two optical circulators, the optical circulators coupling light at a primary pump wavelength and light at an optical signal wavelength in and out of the optical fiber ring and allowing light at a secondary pump wavelength to circulate in only one direction within the optical fiber ring.

According to an embodiment of the present invention, the optical fiber ring preferably includes a wavelength-selective blocking filter positioned between the optical circulators, the wavelength-selective blocking filter substantially preventing lasing at an optical signal wavelength.

According to an embodiment of the present invention, the optical amplifier further comprises an optical reflector placed within the optical fiber ring such that light at a primary pump wavelength is reflected by the reflector.

According to an embodiment of the present invention, the optical amplifier further comprises a wavelength selective optical coupler device, the wavelength selective optical coupler device combining light at a primary pump wavelength and light at an optical signal wavelength in a single optical fiber.

According to an embodiment of the present invention, the optical amplifier further comprises a wavelength selective optical filter having a periodic transmission characteristic such that only light with a wavelength corresponding to the Stokes orders of the primary pump wavelength can pass through the wavelength selective optical filter.

According to an embodiment of the present invention, a portion of the light at a primary pump wavelength is allowed to exit the optical fiber ring for second order distributed Raman pumping an optical transmission fiber.

According to an embodiment of the present invention, the optical amplifier further comprises an even number of wavelength selective optical coupler devices connected in pairs by respective optical fiber links, the coupler devices designed to couple out and return to the optical fiber ring light at wavelengths corresponding to the even Stokes orders of the primary pump wavelength and to substantially transmit light at all other wavelengths.

According to an embodiment of the present invention, 1% to 80% of the light at a secondary pump wavelength is allowed to exit the optical fiber ring for backward distributed Raman pumping an optical transmission fiber.

According to an embodiment of the present invention, a method of amplifying an optical signal is provided comprising the steps of providing an optical fiber ring, emitting ligth a primary pump wavelength into the optical fiber ring, lasing light at a secondary pump wavelength that substantially circulates only in one direction within the optical fiber ring, and amplifying light at an optical signal wavelength within the optical fiber ring, wherein amplifying light at an optical signal wavelength and lasing light at a secondary pump wavelength occur within the same section of the optical fiber ring.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Reference will now be made in detail to presently preferred embodiments of the invention. Wherever possible, the same reference numbers will be used throughout the drawings to refer to the same or like parts.

In the description that follows, the following terms are used for explanation purposes and should be interpreted broadly to include at least the following definitions. The term "primary pump wavelength(s)" should be interpreted to describe one or more primary pump wavelengths generated by one or more pump emitting sources. A single pump source may generate one or more pump wavelengths, or a plurality of pump sources may each generate one or more pump wavelengths. The term "primary pump light" should be interpreted to include all light at the primary pump wavelength(s). Similarly, the term "secondary pump wavelength(s)" should be interpreted to describe one or more of the first or higher Stokes order generated in response to the aforementioned primary pump light. Light at each primary pump wavelength may generate light at one or more secondary pump wavelengths in response thereto. The term "secondary pump light" should be interpreted to include all light at the secondary pump wavelength(s).

Figure 1:
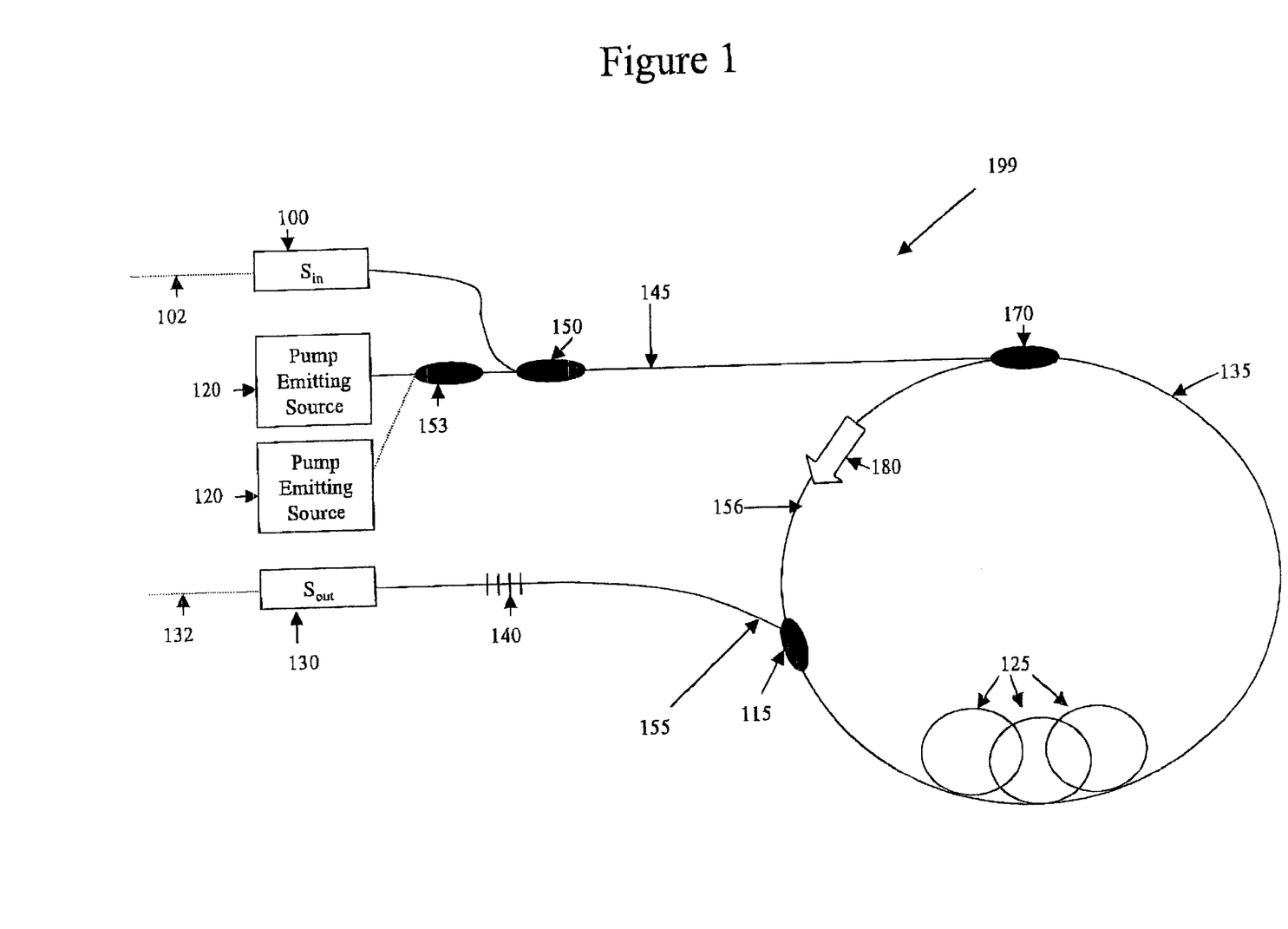
FIG. 1 is a schematic representation of an embodiment of a ring optical amplifier with second order Stokes pumping and WDM couplers according to the present invention.

A first embodiment of an optical amplifier is schematically represented in FIG. 1. The optical amplifier includes an optical fiber ring 135 and a pump light emitting device 120 (e.g., pump source). Preferably, the optical fiber ring 135 comprises an optical fiber having a core and cladding. By way of example but not by way of limitation, the cladding preferably comprises a substantially pure silica glass doped with at least one of F and B, and the core preferably comprises a silica glass doped with at least one of P, Ge, Al, B, F, Be, and Te. A core with the aforementioned composition provides stimulated Raman scattering cross-section sufficiently high to provide amplification of light at a secondary pump wavelength(s) and in the optical signal wavelength range. Further, the aforementioned core and cladding compositions provide that the refractive index of the core is higher than the refractive index of the cladding, such that the primary pump, secondary pump, and signal light are all guided along the optical fiber, preferably in a single optical mode.

The pump source 120 emits light at a primary pump wavelength. Preferably, the pump source 120 has an output of at least 50 mW to substantially create secondary pump wavelength lasing in the optical fiber ring 135. Lasers, such as a semiconductor laser, multiplexed semiconductor lasers (e.g., pump source 120, 121 multiplexed with multiplexer 153), a cascaded Raman laser, and a fiber laser, may be utilized as the pump source.

Preferably, a WDM coupler 150 couples the pump light from the pump source 120 and light at an optical signal wavelength (i.e., signal light) from an optical signal source 100 (e.g., an input optical fiber 102) into one optical fiber 145, such that the pump light and the signal light co-propagate within the optical fiber ring 135. More preferably, WDM coupler 150 combines the pump light and the signal light into one optical fiber 145. WDM coupler 170 couples the combined light into the optical fiber ring 135. The combined light propagates around the optical fiber ring 135 to WDM coupler 115. WDM coupler 115 allows primary pump light and signal light to propagate into optical fiber 155, thereby exiting the optical fiber ring 135.

WDM couplers (e.g., 115, 170) typically have a spectrally periodic nature, similar to the spectrally periodic nature of Stokes orders. In other words, WDM couplers 115, 170 couple primary pump light, but transmit secondary pump light. Thus, WDM coupler 170 couples light at the primary pump wavelength(s), even Stokes orders of the primary pump wavelength(s), and light in a signal wavelength range, allowing them to enter the optical fiber ring 135. Similarly, WDM coupler 115 couples light at the primary pump wavelength(s), even Stokes orders of the primary pump wavlength(s), and light in a signal wavelength range, allowing them to exit the optical fiber ring 135 onto optical fiber 155. Furthermore, both WDM couplers 115 and 170 transmit odd Stokes orders of the primary pump wavelength(s) propagating within the optical fiber ring 135 (in both a clockwise and/or counterclockwise direction), thereby preventing them from exiting the optical fiber ring 135 onto optical fiber 155.

According to this first embodiment, bi-directional generation of Stokes orders is substantially eliminated by restricting the propagation direction of the secondary pump light to only one direction within the optical fiber ring 135. Isolator 180 may be provided to restrict the propagation direction of the secondary pump light to one direction within the optical fiber ring 135. As is well known in the art, optical isolators substantially restrict propagation of light to one direction. As shown in FIG. 1, the secondary pump light would substantially propagate only in the counterclockwise direction.

The function of an optical amplifier 199 according to this first embodiment will now be described in reference to FIG. 1. The light at a primary pump wavelength(s) will undergo Stokes shifting while propagating through at least one section 125 within the optical fiber ring 135 to higher Stokes orders (e.g., second, third, etc.) of the primary pump wavelength(s). The primary pump light (i.e., primary pump wavelength(s) and even Stokes orders) exits optical fiber ring 135 through coupler 115 onto optical fiber 155. The secondary pump light (i.e., secondary pump wavelength(s) and odd Stokes orders), generated by Stokes shifting of the primary pump wavelength(s), continuously circulates around the optical fiber ring 135 and gradually increases in optical power as the primary pump power is increased. As soon as the Raman gain for the secondary pump wavelength (s) is sufficient to compensate for passive loss within the optical fiber ring 135, lasing at the secondary pump wavelength(s) will start, thereby creating Raman gain for light in the optical signal wavelength range copropagating with the primary pump light and counterpropagating with the secondary pump light around section 125 of the optical fiber ring 135. Hence, the primary pump wavelength(s) produces lasing at a secondary pump wavelength(s) by stimulated Raman scattering effect. Lasing at a secondary pump wavelength(s) and amplification of light in the optical signal wavelength range both occur within the optical fiber ring 135. Recirculation of secondary pump light within the optical fiber ring 135 reduces the amount of pump power required to effectively amplify light in the optical signal range, thereby increasing amplifier power conversion efficiency. Moreover, as the secondary pump light counterpropagates with the light in the optical signal range within the optical fiber ring 135, the amount of noise transferred from pump source 120 to the optical signal $S_{in}$ is reduced.

According to this first embodiment, pump conversion efficiency can be improved by returning unused light at a primary pump wavelength(s) back into the optical fiber ring 135 (e.g., eliminating pump leakage). Fiber grating reflector(s) may be positioned to reflect unused pump power exiting the optical fiber ring 135 via WDM coupler 115 back into the optical fiber ring 135.

Fiber grating reflector(s) 140 can be omitted to allow for forward Raman amplification in an output optical fiber 132 (e.g., transmission fiber) coupled to the output 130, if desired. Primary pump light exiting optical fiber ring 135 via WDM coupler 115 (and optical fiber 155) would then enter the output optical fiber 132, thereby providing second-order forward pumping for Raman amplification of light in an optical signal wavelength range copropagating along the output optical fiber 132.

Figure 2:
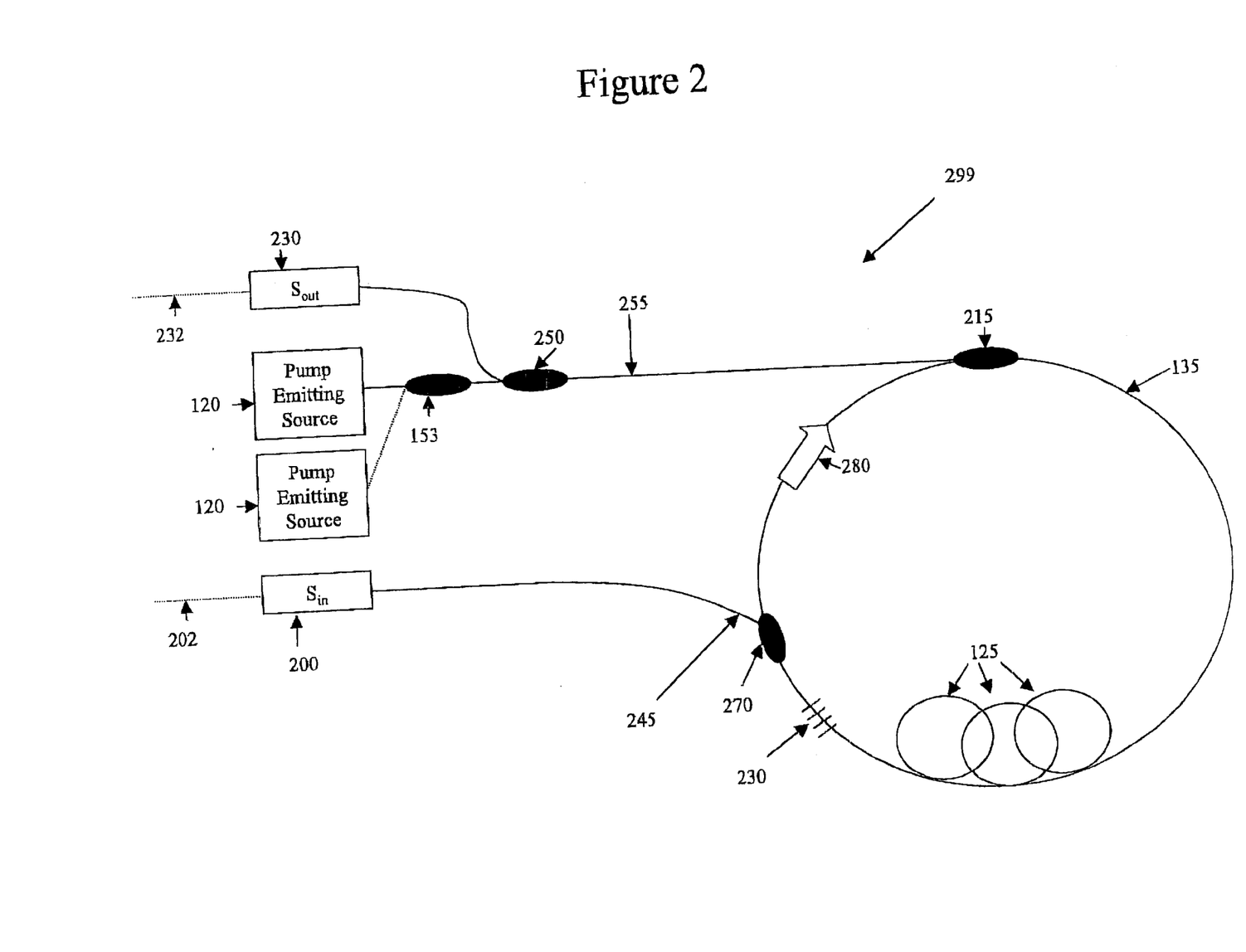
FIG. 2 is a schematic representation of an embodiment of a ring optical amplifier with second order Stokes pumping and WDM couplers providing for discrete and distributed Raman amplification according to the present invention.

As shown in FIG. 2, the present invention can be used as both a discrete Raman amplifier and a first order backward pumped distributed Raman amplifier 299 according to a second embodiment of the present invention. Isolator 280 can be reversed (with respect to Isolator 180 in FIG. 1) to allow the secondary pump light to substantially propagate only in the clockwise direction within the optical fiber ring 135. Signal light in the optical signal wavelength range enters the optical fiber ring 135 via WDM coupler 270 as previously described with respect to WDM coupler 170 of FIG. 1. After passing through the amplifying section 125 of the optical fiber ring 135, light in the optical signal wavelength range is coupled out onto optical fiber 255 by WDM coupler 215. As previously described, lasing occurs when the optical gain for the secondary pump wavelength(s) is sufficient to compensate for passive losses within the optical fiber ring 135.

In this embodiment, lasing at the secondary pump wavelength(s) occurs in a clockwise direction only, as defined by the optical isolator 280. The secondary pump light, however, still counterpropagates in respect to the light in the optical signal wavelength range, reducing pump noise transfer. WDM couplers 215 and 250, thus, are similar to WDM couplers 115 and 150 of FIG. 1. WDM coupler 270, however, is designed to allow a portion light at a secondary pump wavelength(s) to exit the optical fiber ring 135 and enter optical fiber 245, to provide pumping for Raman amplification along input optical fiber 202 coupled to input 200. Preferably, a portion in the range of about 1% to about 80% of light at a secondary pump wavelength(s) exits the optical fiber ring 135 through the WDM coupler 270, the remaining light at a secondary pump wavelength(s) remains within the optical fiber ring 135. The remaining light at a secondary pump wavelength(s) ensures that there is sufficient secondary pump light power to overcome passive losses within the optical fiber ring 135. The exiting portion at a secondary pump wavelength(s) ensures that there is sufficient secondary pump light power entering optical fiber 202 to support backward-pumped distributed Raman amplification along the optical fiber 202. To avoid primary pump light leakage through WDM coupler 270, a fiber grating reflector(s) 230 may be positioned within the optical fiber ring 135, preferably in close proximity to WDM coupler 270, to reflect primary pump light.

According to another embodiment of the present invention, the amplifier 199 of the first embodiment, without the fiber grating reflector(s) 140, can be positioned at the front end of a transmission fiber link, and the amplifier 299 of the second embodiment can be positioned at the back end of the same transmission fiber link, to provide distributed second-order forward pumped Raman amplification in the beginning section of the transmission fiber and distributed first-order backward pumped Raman amplification in the end section of the transmission fiber. Thus, a highly effective four amplification stage amplifier (i.e., two ring amplifiers, forward Raman amplification, and backward Raman amplification) can be provided using only two primary pump light sources. Hence, a highly efficient, and cost effective amplification scheme can be provided by combining various features of the present invention.

As would be readily apparent to one skilled in the art, high-power inexpensive pump sources that emit light at a wavelength(s) separated from an optical signal wavelength range by more than two Stokes shifts are readily available. In conventional discrete Raman amplification devices, higher Stokes (i.e., greater than two Stokes orders) shift capability has generally not been provided.

Figure 3:
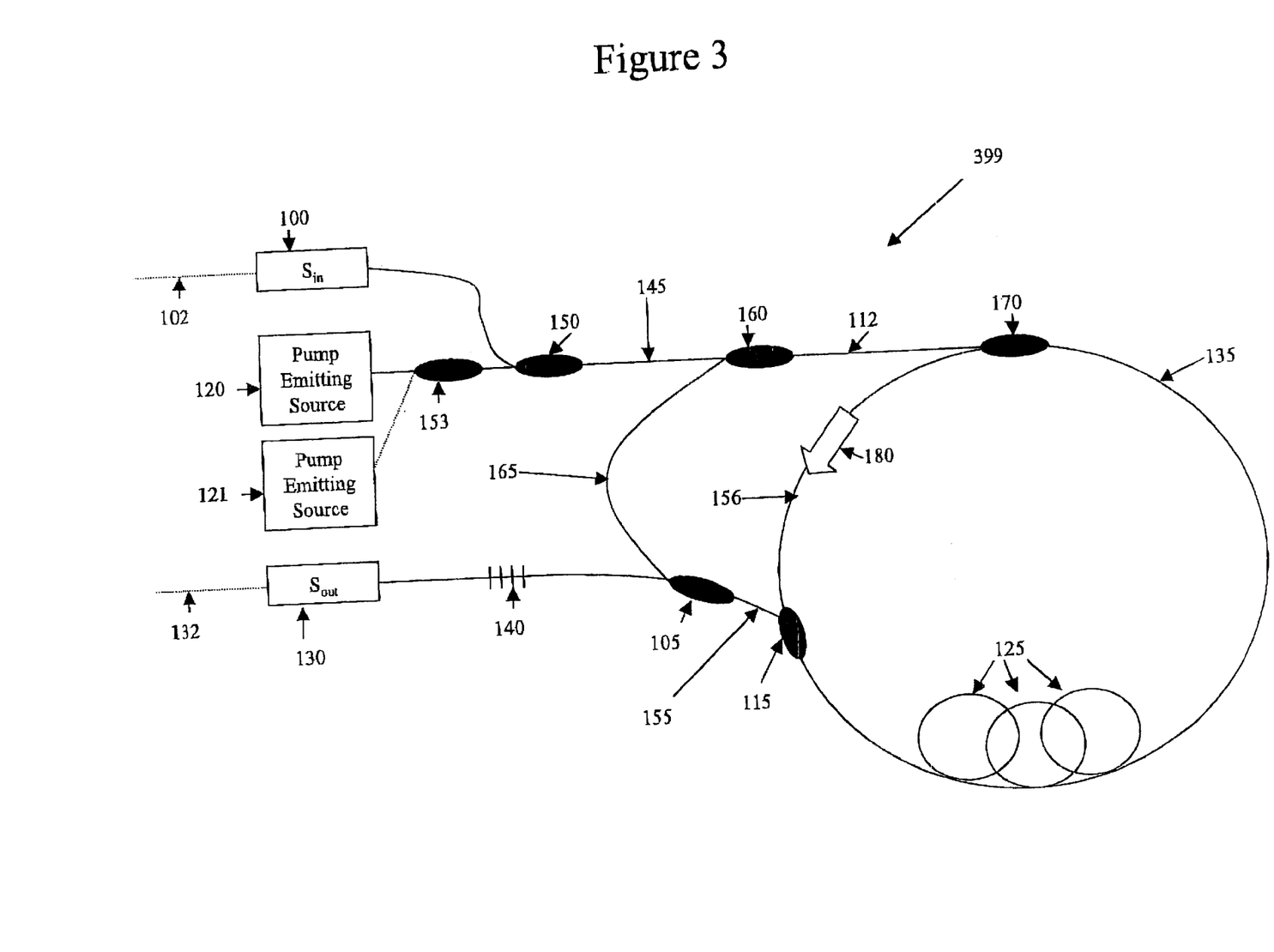
FIG. 3 is a schematic representation of an embodiment of a ring optical amplifier with fourth order Stokes pumping and WDM couplers providing for discrete Raman amplification according to the present invention.

According to any one of the embodiments of the present invention, higher Stokes order ring cavities can be provided to utilize the aforementioned inexpensive pump sources, thereby creating lasing of higher Stokes orders to amplify light at an optical signal wavelength. By way of example, a Raman amplifier pumped by a fourth Stokes order is schematically represented in FIG. 3. As previously described with respect to FIG. 1, combined primary pump light and light in the optical signal wavelength range enter the optical fiber ring 135 via WDM coupler 170. As the primary pump power is increased, the Raman gain for the first Stokes order will also increase until it overcomes the passive loss in the optical fiber ring 135. Then, lasing at the first Stokes order of the primary pump wavelength(s) starts within the optical fiber ring 135. As the primary pump power is further increased, the optical power of the first Stokes order light will quickly build up because the first Stokes order light cannot exit the optical fiber ring 135, providing Raman gain for the second Stokes order (i.e., the first even Stokes order). The second Stokes order light exits the optical fiber ring 135 via WDM coupler 115 and/or 170 due to the spectral periodicity of their transfer characteristics.

Two additional WDM couplers 105 and 160 connected via optical fiber link 165 are provided with different spectral periodicity than WDM couplers 115 and 170. WDM couplers 105 and 160 transmit light at the primary pump wavlength(s), but couple light at the second Stokes order of the primary pump wavelength(s). The WDM couplers 105 and 160, and optical fiber link 165, return second Stokes order light back into the optical fiber ring 135, thereby closing the optical path for the second Stokes order light. Since the optical path for the second Stokes order light is thus closed, lasing in the second Stokes order of the primary pump wavlength(s) will start as soon as the gain provided by the first Stokes order light is sufficient to overcome the total passive loss. Hence, as the primary pump power is further increased, lasing in the third Stokes order will start responsive to the second Stokes order, similar to the first Stokes order in response to the primary pump wavlength(s), providing for amplification of light in the optical signal wavelength range, which corresponds to the fourth Stokes order of the primary pump wavelength(s). As can be seen from FIG. 3, lasing in the second Stokes order will be bi directional, whereas first and third Stokes orders are forced to propagate only in a counterclockwise direction by optical isolator 180. Thus, third Stokes order light will counterpropagate with the optical signal light being amplified by it, thereby minimizing pump noise transfer.

As wavelength selectivity of the WDM couplers is not very strong and Raman gain bandwidth is fairly wide, lasing linewidth will significantly broaden with each next Stokes order, eventually providing greatly enhanced amplification bandwidth for light at a plurality of optical signal wavelengths, even if a single wavelength primary pump source 120 is used. As would be readily apparent to one skilled in the art, any number of additional segments consisting of a fiber ring and a pair of WDM couplers can be implemented to take advantage of pumping in an even Stokes order higher than four.

Another advantage of the present invention, is that a multi-staged optical amplifier may be implemented to provide greater amplification of light at an optical signal wavelength. A multi-staged optical amplifier according to this first embodiment may comprise a plurality of optical amplifiers 199 as previously described. The output 130 of a first optical amplifier 199 would be coupled to the input 100 of a second optical amplifier 199. An isolator may be provided between the stages to reduce backward noise amplification, thereby improving the noise margin of the multi-staged amplifier.

Figure 4:
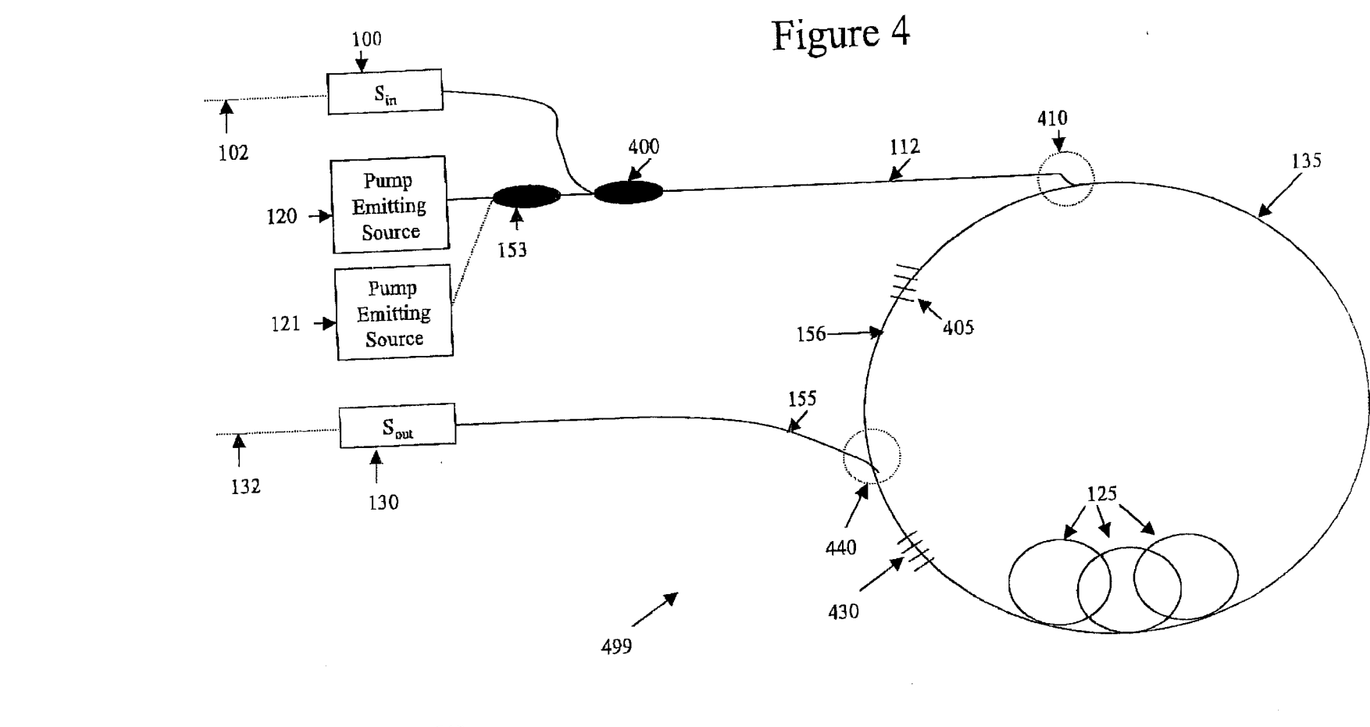
FIG. 4 is a schematic representation of an embodiment of a ring optical amplifier with optical circulators according to the present invention.
Figure 5:
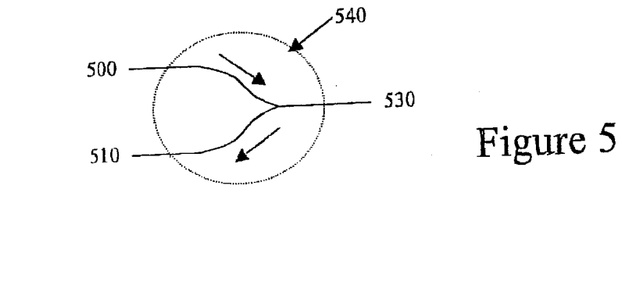
FIG. 5 is a block diagram of an optical circulator according to the present invention.

Another embodiment of an optical amplifier according to the present invention is shown by the block diagram of FIG. 4. This embodiment is similar to the first embodiment, except that certain WDM couplers 170 and 115 are substituted with optical circulators 440 and 410, and additional components are added and/or removed to compensate for this substitution. As is well known in the art, an optical circulator is a three-port device with optical isolation between ports and a circulatory transfer characteristic. The function of optical circulators 410 and 440 will now be described in reference to the optical circulator 540 as shown in FIG. 5. Light entering port 530 circulates to port 510. Light entering port 500 circulates to port 530. For some circulator designs, light entering port 510 circulates to port 530. However, typically this light is blocked and cannot return to either port 500 or port 530. Optical circulators provide many advantages over using WDM couplers as will be described below.

The operation of an optical amplifier according to this fourth embodiment will now be described in detail. Combined primary pump light and light at an optical signal wavelength enters the optical fiber ring 135 via the first optical circulator 410. After propagating through an amplifying section 125 of the optical fiber ring 135, light at an optical signal wavelength exits the optical fiber ring 135 via optical circulator 440. Fiber grating reflector(s) 430 can be positioned inside the optical fiber ring 135, preferably in close proximity to optical circulator 440, to reflect the unused portion of the primary pump light back, thereby substantially preventing pump leakage. As soon as the Raman gain for the secondary pump wavelength(s) is sufficient to compensate for passive loss within the optical fiber ring 135, lasing at the secondary pump wavelength(s) will start, thereby creating Raman gain for light in the optical signal wavelength range.

As optical isolation is inherent to optical circulator designs, no additional isolator (e.g., isolator 180 of FIG. 1) is needed to substantially force the secondary pump light to propagate in only one direction within the optical fiber ring 135. Thus, secondary pump light is forced to propagate in a counterclockwise direction due to the inherent optical isolation of the optical circulators 410 and 440, thereby counterpropagating with light at an optical signal wavelength. An optical filter 405 may be provided between optical circulators 410 and 440 to block light at an optical signal wavelength to avoid lasing of light at an optical signal wavelength in a counterclockwise direction. A reflective or long-period fiber grating, fused fiber coupler or thin-film filter can be utilized as optical filter 405.

The circulator-based ring amplifier according to this fourth embodiment provides all of the aforementioned advantages of the first embodiment, with greater design flexibility. Unlike WDM couplers, optical circulator transmission is not spectrally periodic. If optical circulators are sufficiently broadband (i.e., operate in a broad wavelength range), pumping by any Stokes order n, where n is an integer greater than 1, can be realized in this embodiment. If light at an optical signal wavelength corresponds to an n-th Stokes order of the primary pump light, and the primary pump power is sufficiently high, all of the Stokes orders 1 through n−1 start lasing, and circulate in the optical fiber ring 135 in a counterclockwise direction as defined by the optical circulators 410 and 440. The last lasing Stokes order n−1, provides amplification of light at an optical signal wavelength by stimulated Raman scattering. An optical filter (not shown) with spectrally periodic transmission can be placed in an optical fiber ring 135 to increase the efficiency of Raman cascade generation of Stokes orders 1 through n−1. Filters such as fiber based Mach-Zehnder interferometer or thin-film Fabry-Perot etalon can be used.

Another advantage of optical circulators, is that the amplification band can be substantially widened by implementing a plurality of pump light emitting devices 120, 121 multiplexed together via multiplexer 153, or a multi-wavelength pump source that emits light at a corresponding plurality of primary pump wavelengths. Preferably, any two neighboring wavelengths of the primary pump wavelengths are separated by less than 50 nm to provide a substantially flat gain shape, although the outermost primary pump wavelengths can be separated by as much as the optical circulator design allows, up to a full Stokes spectral shift value for the corresponding wavelength range. Each primary pump wavelength light would then produce lasing at a corresponding secondary pump wavelength within the optical fiber ring 135, and a generated-plurality of secondary pump wavelengths would thus provide broadband signal light amplification. A combiner may be implemented rather than a WDM coupler to combine light at a plurality of pump wavelengths with broadband optical signal light.

Similar to the first embodiment, fiber grating pump reflector(s) 430 can be removed to allow unused primary pump light to exit the optical fiber ring 135 via optical circulator 440. For the second Stokes order pump amplifier, remaining primary pump light can be used to provide second order forward pumped Raman amplification in the optical fiber 132. Moreover, for any Stokes order pump, several of the amplifiers according to FIG. 4 can be connected in series to form a multi-stage amplifier for a greater amplification factor. Due to the inherent isolating properties of optical circulators, no isolators are needed between stages, further reducing cost to build the amplifier over conventional devices and further reducing loss due to additional components. As would readily apparent to one skilled in the art, the various embodiments of the present invention may also be combined to provide a multi-staged amplifier with additional design flexibility.

Thus, a fiber ring Raman amplifier comprising an optical fiber ring and a pump source has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. An optical amplifier comprising:

an optical fiber ring; and a pump source emitting light at at least one primary pump wavelength, said light being optically coupled to said optical fiber ring and generating light at at least one secondary pump wavelength, wherein optical signal amplification and secondary pump wavelength lasing occur within the same section of the optical fiber ring, wherein said at least one primary pump wavelength is separated in frequency from an optical signal wavelength by at least two Stokes orders.

2. An optical amplifier comprising:

an optical fiber ring; and a pump source emitting light at at least one primary pump wavelength, said light being optically coupled to said optical fiber ring and generating light at at least one secondary pump wavelength, wherein optical signal amplification and secondary pump wavelength lasing occur within the same section of the optical fiber ring, wherein the optical fiber ring includes an optical isolator that allows the light at a secondary pump wavelength to circulate in only one direction within the optical fiber ring.

3. An optical amplifier comprising:

an optical fiber ring; and a pump source emitting light at at least one primary pump wavelength, said light being optically coupled to said optical fiber ring and generating light at at least one secondary pump wavelength, wherein optical signal amplification and secondary pump wavelength lasing occur within the same section of the optical fiber ring, wherein said optical fiber has a core and a cladding, said core comprising materials having stimulated Raman scattering cross-sections sufficiently high to provide amplification of light at a secondary pump wavelength and light at an optical signal wavelength, and said core having a refraction index sufficiently higher than the refractive index of the cladding to guide light at the primary pump wavelength and secondary pump wavelength and signal wavelength.

4. The optical amplifier according to claim 3, wherein said core is doped with at least one of $GeO_2$ and $P_2O_5$.

5. The optical amplifier according to claim 1, wherein the pump source comprises one of a semiconductor laser, a rare-earth ion doped fiber laser and a Raman laser.

6. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, further comprising a second pump source emitting light at a pump wavelength, said light at a pump wavelength being optically coupled to said optical fiber ring.

7. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, wherein the optical fiber ring includes two wavelength-selective optical coupler devices, said coupler devices coupling light at a primary pump wavelength and light at an optical signal wavelength in and out of the optical fiber ring and allowing light at a secondary pump wavelength to circulate within the optical fiber ring.

8. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, wherein the optical fiber ring includes two optical circulators, said optical circulators coupling light at a primary pump wavelength and light at an optical signal wavelength in and out of the optical fiber ring and allowing light at a secondary pump wavelength to circulate in only one direction within the optical fiber ring.

9. The optical amplifier according to claim 8, wherein the optical fiber ring includes a wavelength-selective blocking filter positioned between said optical circulators, said wavelength-selective blocking filter substantially preventing lasing at an optical signal wavelength.

10. The optical amplifier according to claim 8, further comprising: an optical reflector placed within said optical fiber ring such that light at a primary pump wavelength is reflected by said reflector.

11. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, further comprising: a wavelength selective optical coupler device, said wavelength selective optical coupler device combining light at a primary pump wavelength and light at an optical signal wavelength in a single optical fiber.

12. The optical amplifier according to claim 11, further comprising a wavelength selective optical filter having a periodic transmission characteristic such that only light with a wavelength corresponding to the Stokes orders of the primary pump wavelength can pass through said wavelength selective optical filter.

13. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, wherein a portion of the light at a primary pump wavelength is allowed to exit said optical fiber ring for second order distributed Raman pumping an optical transmission fiber.

14. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, further comprising: an even number of wavelength selective optical coupler devices connected in pairs by respective optical fiber links, said coupler devices designed to couple out and return to said optical fiber ring light at wavelengths corresponding to the even Stokes orders of the primary pump wavelength and to substantially transmit light at all other wavelengths.

15. An optical amplifier comprising:
an optical fiber ring; and
a pump source emitting light at at least one primary pump wavelength, said light being optically coupled to said optical fiber ring and generating light at at least one secondary pump wavelength,
wherein optical signal amplification and secondary pump wavelength lasing occur within the same section of the optical fiber ring, further comprising: an optical reflector coupled to said optical fiber ring, said optical reflector reflecting light at a primary pump wavelength exiting said optical fiber ring back into said optical fiber ring.

16. An optical amplifier comprising:
an optical fiber ring; and
a pump source emitting light at at least one primary pump wavelength, said light being optically coupled to said optical fiber ring and generating light at at least one secondary pump wavelength, wherein optical signal amplification and secondary pump wavelength lasing occur within the same section of the optical fiber ring, wherein 1 to 80% of the light at a secondary pump wavelength is allowed to exit said optical fiber ring for backward distributed Raman pumping an optical transmission fiber.

17. A multi-staged optical amplifier comprising: a plurality of optical amplifiers connected in series, wherein each of said plurality of optical amplifiers includes an optical fiber ring; and a pump source emitting light at at least one primary pump wavelength, said light being optically coupled to said optical fiber ring and generating light at at least one secondary pump wavelength, wherein optical signal amplification and secondary pump wavelength lasing occur within the same section of the optical fiber ring.

18. A method of amplifying an optical signal, comprising the steps of:

providing an optical fiber ring;

emitting light at a primary pump wavelength into said optical fiber ring;

lasing light at a secondary pump wavelength that substantially circulates only in one direction within said optical fiber ring; and amplifying light at an optical signal wavelength within said optical fiber ring, wherein amplifying light at an optical signal wavelength and lasing light at a secondary pump wavelength occur within the same section of the optical fiber ring.

19. The method according to claim 18, further comprising a step of: emitting light at another primary pump wavelength into sa optical fiber ring.

20. The method according to claim 18, wherein the step of lasing at a secondary pump wavelength is produced by stimulated Raman scattering effect in the nth Stokes order, n being an integer.

21. The method according to claim 18, wherein the step of amplifying light at an optical signal wavelength is performed by stimulated Raman scattering in the first Stokes order.

22. The method according to claim 18, wherein the primary pump wavelength is separated in frequency from said optical signal wavelength by at least two Stokes orders.

23. The method according to claim 18, further comprising a step of: restricting light at a secondary pump wavelength to circulate in only one direction within the optical fiber ring.

24. The method according to claim 18, wherein said optical fiber has a core and a cladding, said core comprising materials having stimulated Raman scattering cross-sections sufficiently high to provide amplification of light at the secondary pump wavelength and light at an optical signal wavelength, and said core having a refraction index sufficiently higher than the refractive index of the cladding to guide light at the primary pump wavelength and secondary pump wavelength and signal wavelength.

25. The method according to claim 24, wherein said core is doped with at least one of $GeO_2$ and $P_2O_5$.

26. The method according to claim 18, wherein the step of emitting light at a primary pump wavelength is performed by one of a semiconductor laser, a rare-earth ion doped fiber laser and a Raman laser.

27. The method according to claim 18, further comprising a step of: substantially preventing lasing at an optical signal wavelength.

28. The method according to claim 18, further comprising a step of: reflecting light at a primary pump wavelength circulating within said optical fiber ring.

29. The method according to claim 18, further comprising a step of: combining light at a primary pump wavelength and light at an optical signal wavelength in a single optical fiber.

30. The method according to claim 18, wherein a portion of the light at a primary pump wavelength is allowed to exit said optical fiber ring for second order distributed Raman pumping an optical transmission fiber.

31. The method according to claim 18, further comprising a step of: returning to said optical fiber ring light at wavelengths corresponding to the even Stokes orders of the primary pump wavelength.

32. The method according to claim 18, further comprising a step of: reflecting light at a primary pump wavelength exiting said optical fiber ring back into said optical fiber ring.

33. The method according to claim 18, wherein 1 to 80% of the light at a secondary pump wavelength is allowed to exit said optical fiber ring for backward distributed Raman pumping an optical transmission fiber.

* * * * *